Sept. 21, 1926.

R. S. CURLEY

COTTON DISTRIBUTING MECHANISM

Filed Nov. 21, 1923

INVENTOR.
Robert S. Curley.
By his Attorney
J. H. McCurdy

Patented Sept. 21, 1926.

1,600,935

UNITED STATES PATENT OFFICE.

ROBERT S. CURLEY, OF LOWELL, MASSACHUSETTS, ASSIGNOR TO SACO-LOWELL SHOPS, OF BOSTON, MASSACHUSETTS, A CORPORATION OF MASSACHUSETTS.

COTTON-DISTRIBUTING MECHANISM.

Application filed November 21, 1923. Serial No. 676,033.

It is customary in modern cotton mills to deliver cotton to various points where it is to be worked, and particularly to the machines in the picking room, by means of a conveyor, and to control the distribution of cotton to the individual machines by an automatic mechanism known as a Morton distributor. Each individual machine unit usually includes an automatic feeder, and the distributing mechanism comprises a feeler responsive to changes in the supply of cotton in the feeder hopper, and mechanism driven by the machine but under the control of the feeler for starting or stopping the delivery of cotton to the hopper. The machine units so supplied with cotton are often equipped with a mechanism which automatically stops the cotton working operation under predetermined conditions, and it may happen that this operation will be stopped immediately after the delivery of cotton to the feeder hopper has been initiated by the feeler. Unless the cotton working mechanism is immediately started up again, there is great danger, therefore, that the feed hopper may be filled and overflowed before the condition is discovered and the flow of cotton is shut off. To devise a simple but effective mechanism for preventing an occurrence of this kind constitutes the chief object of the present invention.

The nature of the invention will be readily understood from the following description when read in connection with the accompanying drawings, and the novel features will be particularly pointed out in the appended claims.

Referring now to the drawings,

Figure 1 is a side elevation of a machine equipped with mechanism embodying the present invention; and Fig. 2 is a plan view of a part of the mechanism shown in Fig. 1.

The apparatus shown comprises a lapper 2 connected with a beater 3 and feeder 4, these three elements being constructed, connected, and operated in the usual manner. The feeder includes a hopper 5 and the usual feed aprons 9 which are driven from the sprocket 6 and work the cotton toward the beater 3. The cotton passes through the beater and is delivered to a condenser which forms a part of the lapper. The lapper is equipped with the usual mechanism for stopping it, and this mechanism includes a drop bar 7 which is arranged to be released automatically when a lap is completed, as is well understood by those skilled in this art. When this bar is dropped, either in this manner or by being released manually, it stops the lapper, feed aprons and all of the running parts of the apparatus except the beater 3, feeder doffer 19, and the condenser fan. This arrangement is necessary in order to keep the cotton from accumulating at some intermediate point in the apparatus, the only parts which are left running being those which cannot cause any such accumulation. It will be observed that the driving sprocket 6 for the feed aprons is chain driven from a sprocket 8 which, in turn, is driven from a horizontal shaft 10 which derives its power from the lapper 2, so that when the lapper is stopped, this whole driving mechanism is stopped. The beater shaft 12, however, is driven directly from a pulley 13 on the counter-shaft 14, and a belt connection 15 is provided between the beater shaft and the doffer shaft 16, while another belt connection 17 is provided between the beater shaft and the condenser fan shaft 18. Consequently, the driving of the shafts 12, 16 and 18 is not affected by the stopping of the lapper. This fact is utilized in operating the controlling mechanism for the cotton distributing apparatus.

This apparatus comprises a conveyor belt 20, which supplies cotton to a line of machines similar to that shown in Fig. 1, and the discharge of cotton from this belt into the hopper 5 of the feeder is controlled by a gate 21. This gate is pivoted at one side of the belt and is arranged to be moved from an open position, as shown in Fig. 2, where it projects diagonally across the belt, to a closed position, where it lies beside the belt, or vice versa. The operating mechanism for this gate includes a link 22 which connects the gate with the upper end of a lever 23, fulcrumed on the hopper frame at 24. Pivotally mounted on this lever is a segment 25 that is constantly oscillated by means of a rod 26 which connects the segment with an eccentric pin 27 carried by a rotating disk 28. This disk rotates with a gear 30 which meshes with a pinion 31 secured on the doffer shaft 16. Cooperating with the segment 25 is a double-ended latch or dog 32 which is pivoted on the lever 23 and is arranged to be moved into engagement with either one of the lugs 33 or 34 at opposite extremities of the segment 25. This movement of the latch 32 is effected through connections with a feeler fork 35 mounted within the hopper 5 and secured to a rock shaft 36 journaled in the upper part of the hopper. An arm 37, fast on this rock shaft, is connected by a rod 38 with another arm which is rigid with the latch 32. The feeler is urged forward by a weighted arm 39 carried by a gear 40 which meshes with a toothed sector 41 secured to the rock shaft 36.

So long as the supply of cotton in the hopper 5 holds the feeler 35 back against the wall of the hopper, the gate 21 will be maintained in its closed position; that is, standing beside the conveyor belt 20 where it is inoperative to divert cotton into the hopper. When the supply of cotton in the hopper, however, becomes depleted, the feeler 35 will be swung inwardly and this movement will be transmitted to the latch 32, shifting the left-hand end, Fig. 1, of this latch into engagement with the segment 25. Consequently, upon the next swing of the segment toward the right, the lever 23 will also be swung toward the right, and will move the gate 21 into its open position, as shown in Fig. 2, where it will discharge cotton into the hopper.

With the arrangement heretofore employed, if the lapper 2 should now be shut down, the discharge of cotton into the hopper would continue uninterruptedly with the danger of overflowing the hopper, as above described. In the present arrangement, however, this cannot occur for the reason that even if the lapper should be shut down, the actuating mechanism for the gate will still be maintained in operation, notwithstanding the fact that the cotton working operation has been stopped. Consequently, when the supply of cotton in the hopper has been replenished, the feeler will readjust the latch 32 again and enable the segment to effect the closing of the gate, regardless of whether or not the lapper or feeder are in operation.

It will thus be appreciated that the invention provides a cotton handling apparatus which is more completely automatic than such apparatus has been heretofore, and that it completely eliminates the overflowing of the hopper in the manner above described. At the same time, the mechanism provided by the invention does not add materially to the expense of manufacture of the machine.

Having thus described my invention, what I desire to claim as new is:

1. An apparatus of the character described comprising, in combination, a cotton working machine, a feeder for feeding cotton to said machine, conveying means for carrying cotton to said feeder, a feeler responsive to changes in the supply of cotton in the feeder, power operated mechanism controlled by said feeler for controlling the discharge of cotton from said conveying means to said feeder, and means for driving said power operated mechanism independently of the feeding mechanism.

2. An apparatus of the character described comprising, in combination, a cotton feeder including a hopper and a driven feed apron, means for supplying cotton to said hopper, a feeler mounted in said hopper and responsive to changes in the supply of cotton therein, a device movable to start or stop the discharge of cotton from said means into said hopper, power operated mechanism under the control of said feeler for moving said device from one operative position to another, and means for driving said power operated mechanism independently of said feed apron.

3. An apparatus of the character described comprising, in combination, a cotton feeder including a hopper and a driven feed apron, a conveyor belt for supplying cotton to said hopper, a gate for diverting cotton from said belt into said hopper and movable into either an open or closed position, power operated mechanism driven independently of said apron for moving said gate from one of said positions to the other, and means including a feeler mounted in said hopper for controlling the movement of said gate by said mechanism.

4. An apparatus of the character described comprising, in combination, a cotton feeder including a hopper and a driven feed apron, a conveyor belt for supplying cotton to said hopper, a gate for diverting cotton from said belt into said hopper and movable into either an open or closed position, a rotary doffer cooperating with said feed apron, a shaft supporting said doffer, power operated mechanism driven from said shaft for moving said gate from one of said positions to the other, and means including a feeler mounted in said hopper and responsive to changes in the supply of cotton therein for controlling the adjustment of said gate by said mechanism.

ROBERT S. CURLEY.